United States Patent [19]

Phillips

[11] Patent Number: 5,084,780
[45] Date of Patent: Jan. 28, 1992

[54] TELESCOPIC SIGHT FOR DAY/NIGHT VIEWING

[75] Inventor: Earle N. Phillips, Roanoke, Va.

[73] Assignee: ITT Corporation, New York, N.Y.

[21] Appl. No.: 643,690

[22] Filed: Jan. 18, 1991

Related U.S. Application Data

[63] Continuation of Ser. No. 406,219, Sep. 12, 1989, abandoned.

[51] Int. Cl.$^5$ .................. G02B 23/00; G02B 23/04; G02B 23/12

[52] U.S. Cl. .................. 359/350; 359/353; 359/400; 359/419

[58] Field of Search ............. 350/1.2, 538, 557, 558, 350/569

[56] References Cited

U.S. PATENT DOCUMENTS

| | | | |
|---|---|---|---|
| 2,221,609 | 11/1940 | Sanger | 350/569 |
| 3,509,344 | 4/1970 | Bouwers | 350/538 |
| 4,467,190 | 8/1984 | Hadani | 350/538 |
| 4,576,432 | 3/1986 | Ruger | 350/1.2 |
| 4,629,295 | 12/1986 | Vogl | 350/1.2 |
| 4,653,879 | 3/1987 | Filipovich | 350/1.2 |
| 4,655,562 | 4/1987 | Kreitzer et al. | 350/538 |
| 4,775,217 | 10/1988 | Ellis | 350/538 |
| 4,828,378 | 5/1989 | Ellis | 350/538 |
| 4,863,269 | 9/1989 | Ellis | 350/538 |
| 4,867,549 | 9/1989 | Sekine | 350/569 |

FOREIGN PATENT DOCUMENTS

895856 2/1945 France ................. 350/569
430260 8/1967 Switzerland ............. 350/538

Primary Examiner—Jon W. Henry
Attorney, Agent, or Firm—Arthur L. Plevy; Patrick M. Hogan; Peter A. Abruzzese

[57] ABSTRACT

A telescopic sight which can be used for either nighttime or daytime operation and is particularly adaptable for use on weapons ranging from rifles to anti-tank weapons.

A first embodiment includes a single objective and two parallel light paths, one for day viewing and one for night viewing. The objective forms the beginning of the night path. Separating mirrors transmit light from the objective along the night path and reflects light from the objective to the day path. The night path includes an image intensifier assembly. A mirror at the end of the night path reflects the light from the image intensifier assembly to a beamsplitter/combiner on the day path. The beamsplitter/combiner transmits the light from the day path and reflects the light from the night path along the same path to an ocular assembly for viewing.

A second embodiment of the telescopic sight is similar to the first embodiment but contains two objective lens assemblies for collecting light, one for the night path and one for the day path. Because the sight has two separate objective lens assemblies, separating mirrors are not included.

A third embodiment includes a projected aiming reticle and a direct view capability for day viewing which replaces one of the objective lens assemblies. The direct view channel includes a beamsplitter/combiner.

11 Claims, 6 Drawing Sheets

TELESCOPIC SIGHT FOR DAY/NIGHT VIEWING

This is a continuation of application Ser. No. 07/406,219, filed Sept. 12, 1989, now abandoned.

BACKGROUND OF THE INVENTION

This invention relates to telescopic sights and more particularly to a telescopic sight which can be employed for either nighttime or daytime operation and which is particularly adaptable for application on weapons ranging from rifles to anti-tank weapons. When not mounted to a weapon, the sight may be used for observation purposes.

There currently exists an abundance of devices for aiming a weapon which are generally designated as sights. In general a sight is utilized for aiming a weapon during daytime operation at a directly visible target and during nighttime operation at a target which is only visible through the use of some vision aiding device.

Daytime sight devices range from simple front and rear sights like those on ordinary rifles to complex systems for large weapons. The sighting devices are mounted to a weapon and boresighted to that weapon for accurate aiming.

Certain sophisticated types such as telescopes are utilized to magnify a target and to enable the user during normal daytime operation to view a magnification of the target area at which he is aiming.

There are also nighttime vision devices or sights which employ image intensifiers or similar structures. The function of an image intensifier is to multiply the amount of incident light received by it to produce a signal that is bright enough for presentation to the eyes of a viewer. As such, these devices have been employed by the military and in commercial devices as well. Sights vary in size, magnification, type of reticle, weapon application and level of performance.

Several combination day/night weapon sights are known. One type of sight employs a modular configuration as is shown in U.S. Pat. No. 4,822,994. In this configuration, the front end of a telescopic sight is separable from the rest of the sight. For nighttime use an image intensifier module is inserted between the sections. However, for daytime operation, the user must disassemble the sight and remove and store the image intensifier module.

U.S. Pat. No. 4,629,295 is directed to another type of night viewing device which is an add-on accessory to day rifle sights. This device is attached directly to the day rifle scope. It includes an objective assembly which receives the image and directs it to a night vision device. The intensified image is then directed to the day sight for viewing. Again, the device is bulky and must be carried by the user or stored during daytime operations.

One disadvantage to having separate daytime and nighttime sights is that the sights must be individually boresighted to the weapon whenever the sight is initially installed, and must be checked for boresight whenever the sight is reinstalled on the weapon. Current use of weapon sights by law enforcement and military personnel and by civilian users involves the careful mounting and boresighting of a day and/or night vision sight to the weapon. For maximum accuracy, actual firing of the weapon is required during the boresighting process. This is not generally feasible under combat conditions. Separate weapon sights are also disadvantageous because the sights must be interchanged for day or night use. In addition, the separate night vision sight adds an additional three to four pounds which must be carried and handled separately by the user.

Another type of sight employs an integral configuration in which both day and night devices form part of the sight. In this sight, a plate carrying both day and night optical systems is rotated to position the day or night optical system to be used in the optical path, i.e. in the line of target sighting. This configuration usually takes more space and has a greater total weight than the separate systems it replaces.

It is therefore an object of the present invention to provide a telescopic sight which has an integral day/night viewing system.

It is another object of the present invention to provide a day/night telescopic sight for which boresighting is performed only once without the need for separate boresighting for day or night use.

It is still an additional object of the invention to provide a day/night telescopic sight which is light in weight, has a low profile configuration and is simple to operate.

It is an additional object to provide a day/night weapon sight which can be employed in a variety of sizes for application on weapons ranging from rifles to machine guns, grenade launchers, anti-tank weapons and the like.

SUMMARY OF THE INVENTION

These objects, and others which will become apparent hereinafter, are accomplished by the present invention which provides a telescopic sight for day and night operations which includes in one embodiment an objective lens assembly for directing an incoming image along a first optical path; an image intensifier assembly located on the first optical path for night viewing of the image, optical means for day viewing of the image located in a second optical path which is parallel to the first optical path, an ocular lens assembly located on the second optical path, adjacent the optical means, for transmitting the image from the image intensifier assembly and the optical means along a common path to a viewer. The sight also includes means located between the objective lens assembly and image intensifier assembly in the first optical path for separating the light from the image transmitted by the objective lens assembly into near-infrared and visible spectra, the separating means passing near-infrared light to the image intensifier assembly and reflecting visible light to the optical means; and means located adjacent the output surface of the image intensifier assembly for transmitting the image from the image intensifier assembly to the second optical path at a location between the exit surface of the optical means and the ocular lens assembly.

Another embodiment of the present invention includes a telescopic sight for day and night operations which is similar to the first embodiment but contains two objective lens assemblies for collecting light, one in the near-infrared spectrum and one in the visible spectrum. Because the sight has two separate objective lens assemblies, separating means are not included.

A third embodiment includes a projected aiming reticle and a direct view capability for day viewing which replaces one of the objective lens assemblies.

BRIEF DESCRIPTION OF THE DRAWINGS

The above-mentioned and other features and objects of this invention will become more apparent by reference to the following description taken in conjunction with the accompanying drawing in which.

DESCRIPTION OF THE PREFERRED EMBODIMENT

Figure 1:
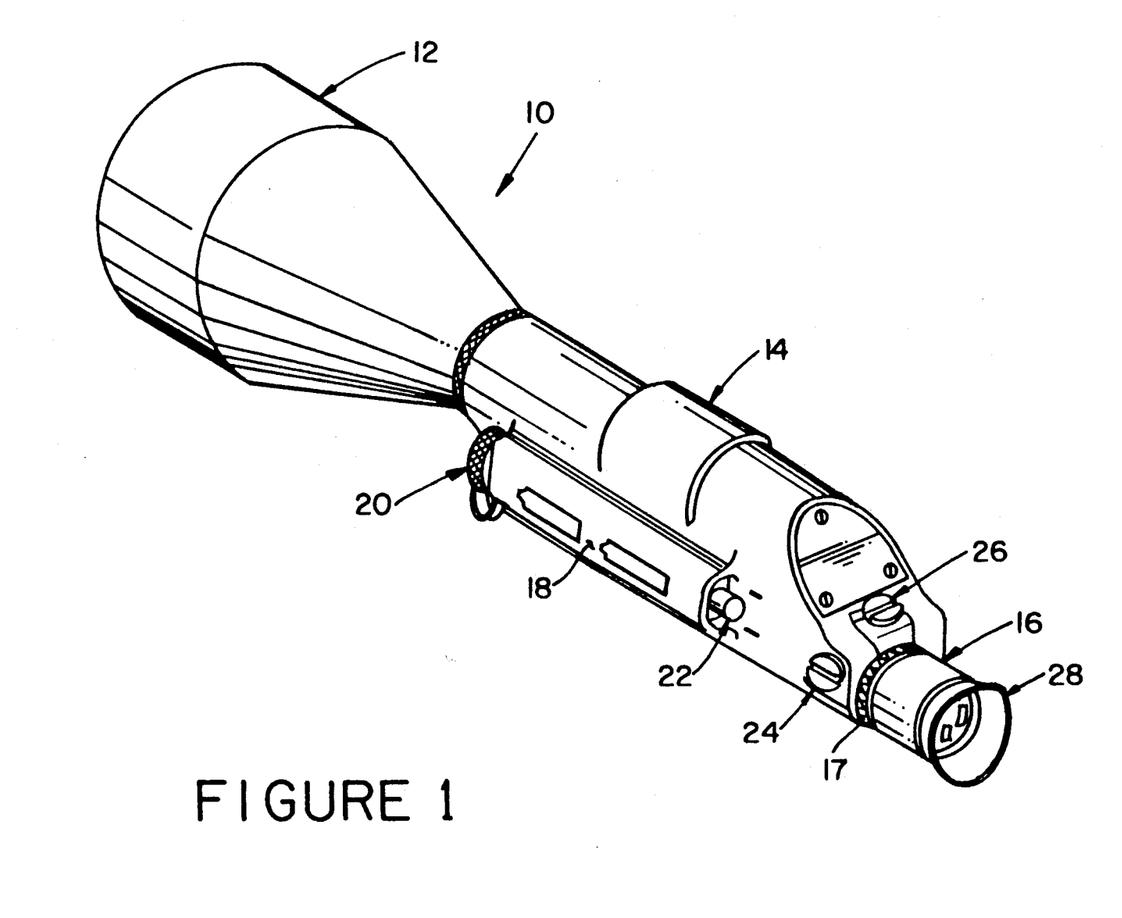
FIG. 1 is a perspective view of a single channel embodiment of the present invention showing a variable power day/night telescopic sight including a long-range objective lens.
Figure 2:
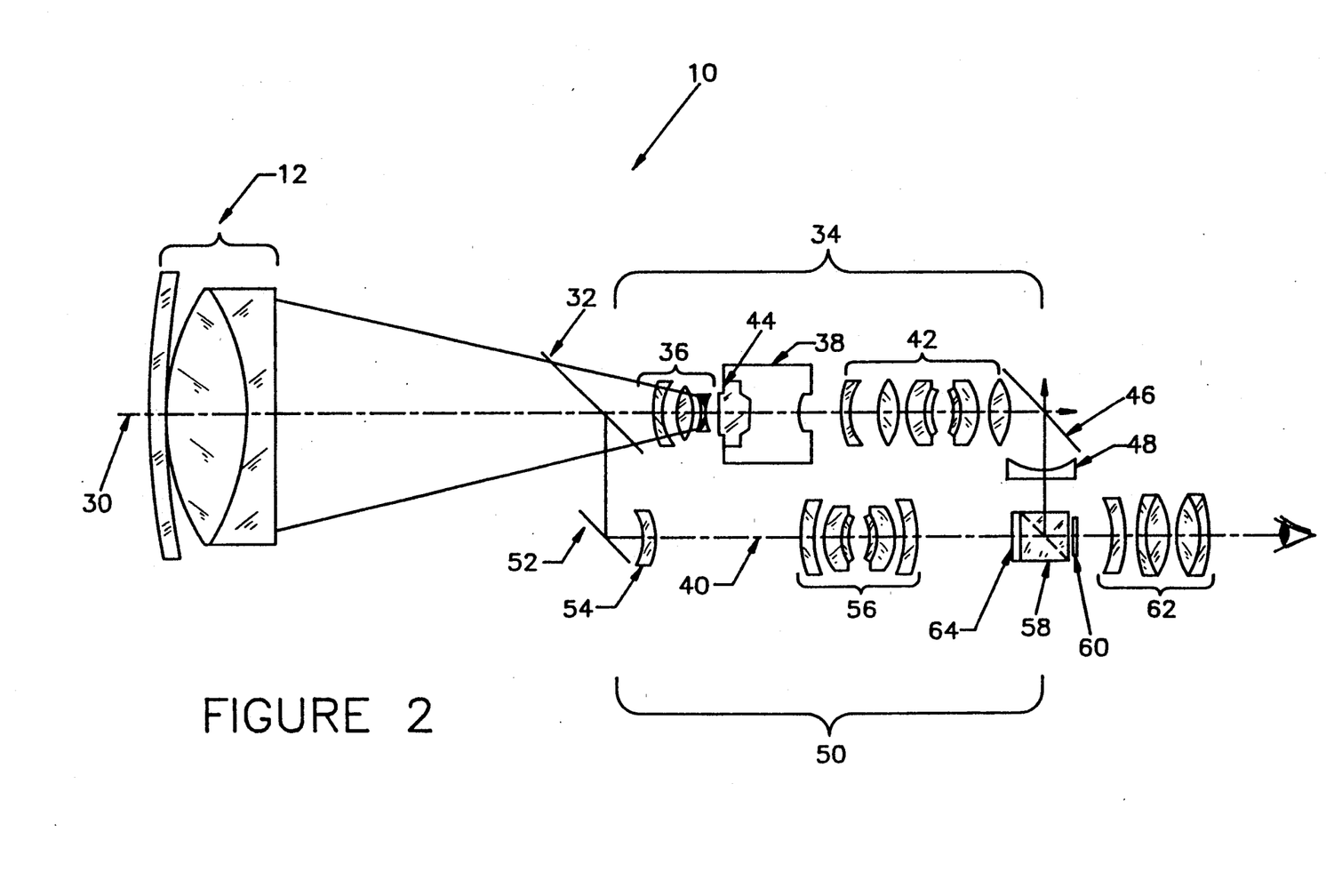
FIG. 2 is a diagrammatic representation of the embodiment of FIG. 1.
Figure 3:
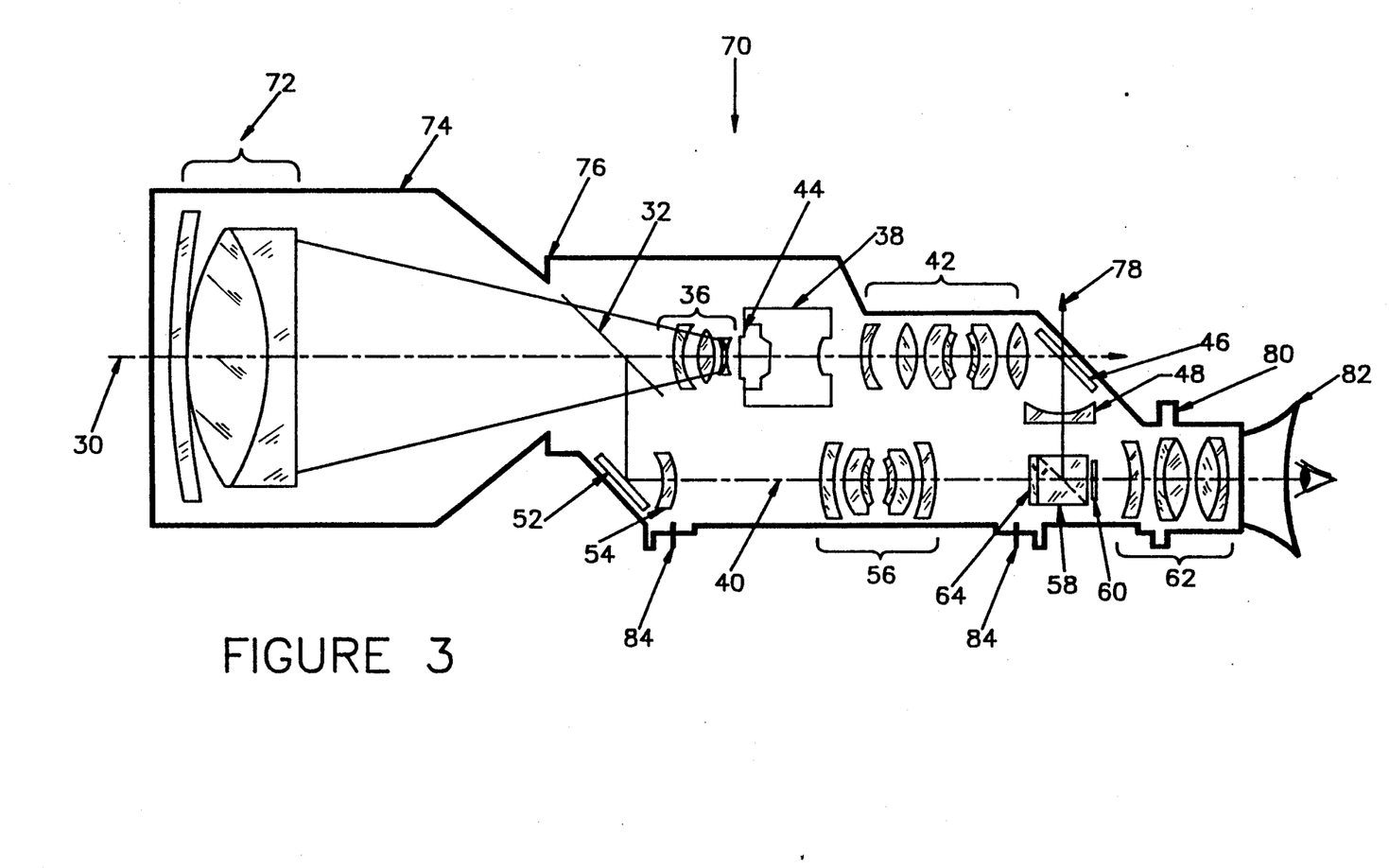
FIG. 3 is a diagrammatic representation of the day/night telescopic sight of FIG. 2 which includes a short-range objective lens.
Figure 4:
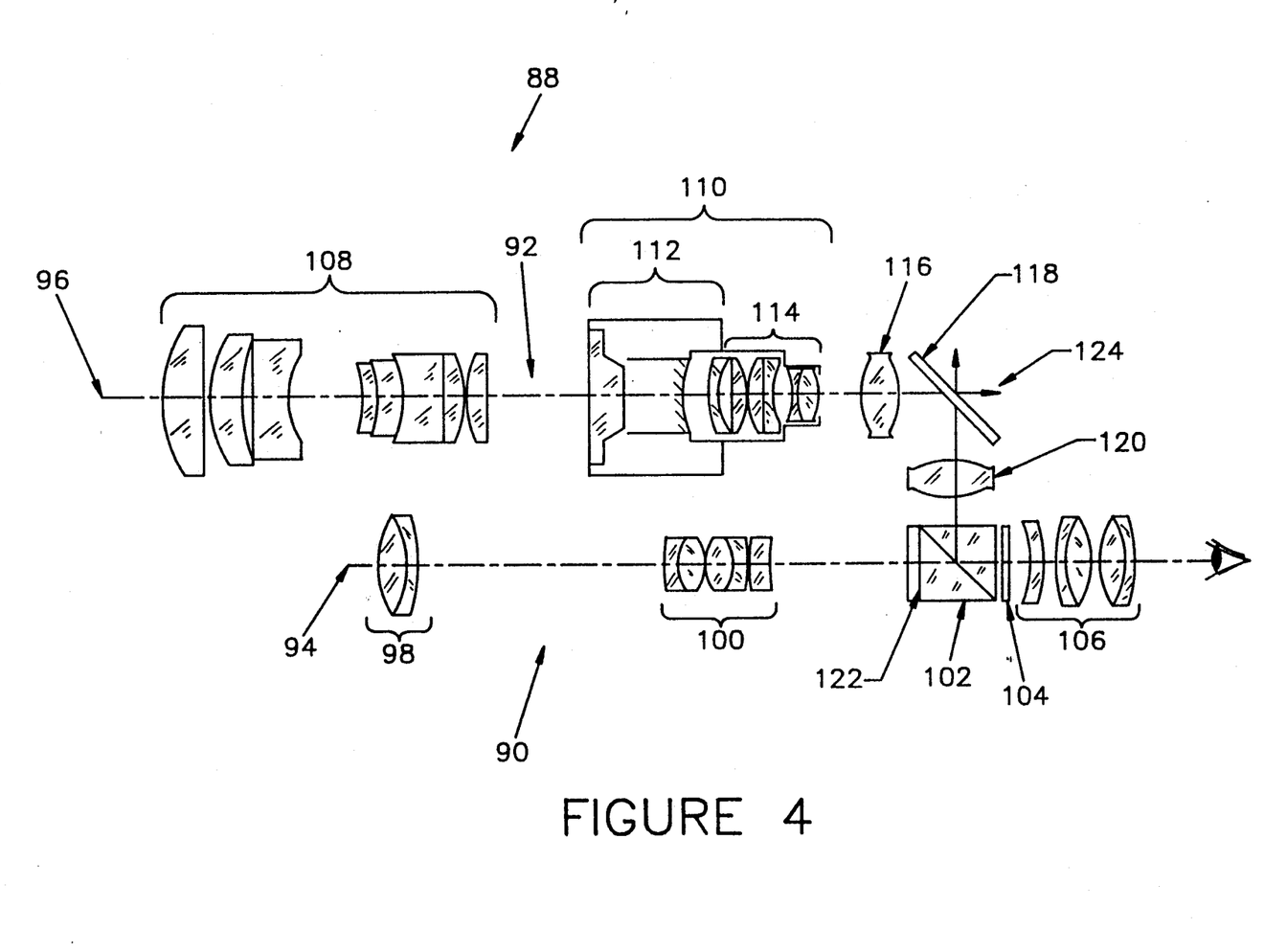
FIG. 4 illustrates in diagrammatic form a dual channel embodiment of the invention in which the telescopic sight has a separate input for day and night viewing.
Figure 5:
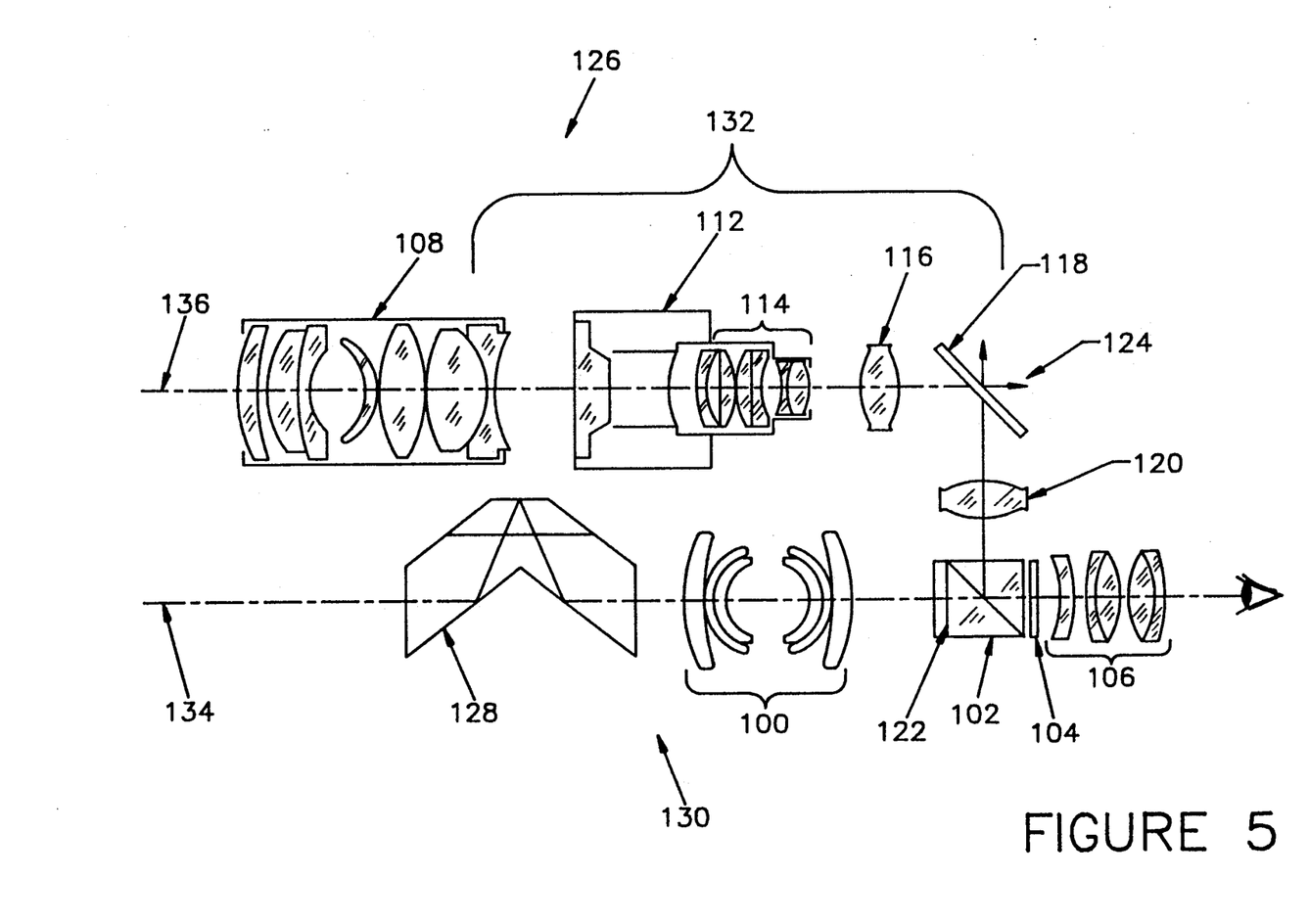
FIG. 5 illustrates in diagrammatic form the embodiment of FIG. 4 using a prism.
Figure 6:
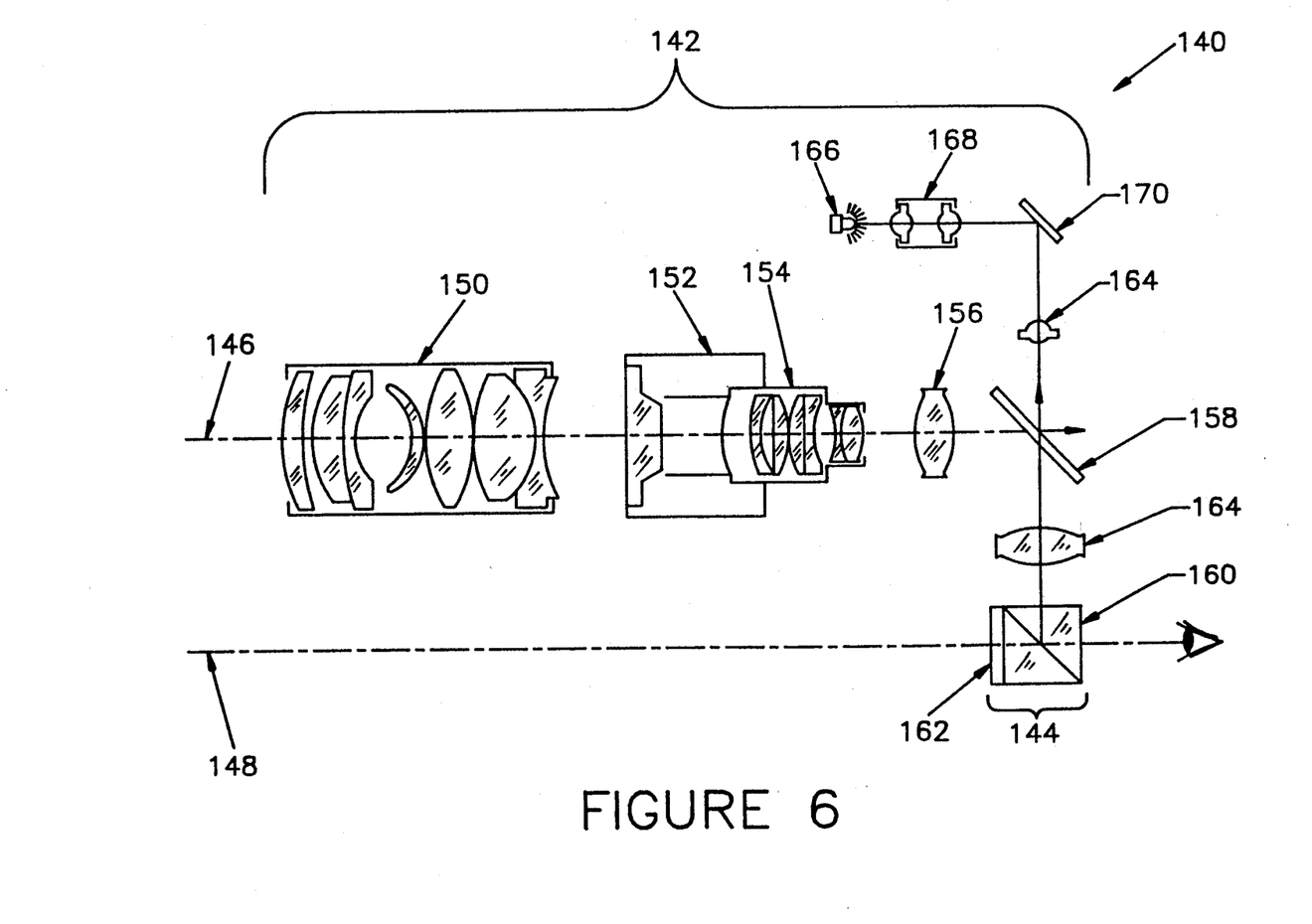
FIG. 6 shows a modification of the dual channel embodiment of the telescopic sight using a projected reticle.

In one embodiment of the invention a telescopic sight has a single objective for both day and night viewing and is shown in FIGS. 1-3. In a second embodiment, a telescopic sight has two separate objectives, one for day viewing and one for night viewing. This embodiment is shown in FIGS. 4-6. The term "forward" is used hereinafter to designate a direction towards the object to be observed, and the term "rearward" is used to designate a direction towards the user of the sight. The terms above and below are determined by the "in use" position of the sight. Optical axes are shown in broken lines, and optical paths follow the broken and solid lines.

The single channel sight will now be described with reference to FIG. 1. A telescopic day/night sight 10 useful for long range weapons is shown in a perspective view. The sight 10 includes an objective lens assembly 12 at the forward end, a body section 14 and an eyepiece 16. Although a long range objective lens is shown, a smaller lens may be used for short range operation. The body section 14 houses the day and night viewing systems. A battery compartment 18 with a battery cap 20 accepts two standard "AA" batteries although other sizes can be used. The batteries supply power to the image intensifier tube of the night viewing system.

An ON-OFF switch 22 controls illumination of a reticle located inside the body section 14. Boresighting corrections are made by means of an azimuth adjusting screw 24 and an elevation adjusting screw 26 which are joined to the reticle.

A focusing ring 17 permits forward-rearward movement of the eyepiece 16. A protective eyeguard 28 comprises the rearward end of the sight 10.

The sight 10 is mounted to a weapon using commercially available adapter brackets.

FIG. 2 shows the optical layout of the sight 10. The night and day viewing systems extend parallel to each other. As illustrated, the night viewing system is located above the day system when the sight is in an upright position. The sight could also be configured with the day optical axis positioned above the night optical axis. The optical axes of the sight are indicated by broken lines 30, 40. The elements of the sight are described proceeding rearwardly along the optical axis 30 of an incoming light beam. The objective lens assembly 12 includes one or more optical elements to collect and focus available light from the viewed scene. Objective lens assemblies form inverted images and are well known in the art. A dichroic mirror or beamsplitter 32 is positioned with its forward surface forming an angle of, for instance, 45° with the optical axis 30.

Following the mirror 32 is a night viewing system 34 which includes a field group 36, an image intensifier tube 38 and a relay lens system 42. The field group 36 includes one or more optical elements which control the size and/or angular breadth of the object which is passed to the image intensifier tube. The image intensifier tube is a Generation III (Gen III) image intensifier device which employs a gallium-arsenide photocathode 44 with an inverting output. Such tubes are well known in the art. While a Gen III tube is preferred, other types of image intensifier tubes are within the scope of the invention. The system 42 includes one or more lenses which function to collimate the light emerging from the image intensifier tube 38.

Beyond the relay lens system 42 on optical axis 40 is a front surface turning mirror 46 which is positioned with its forward surface forming a given angle (illustrated as a 45° angle) with the optical axis 30. A two-axis adjustment means 78 is joined to the mirror 46. The adjustment means may be joined instead to the mirror 52. Such means are well known in the art and are not described herein. Positioned below the mirror 46 is a focusing lens A day viewing system 50 extends along the second optical axis 40. The optical axis 40 begins at a point below the dichroic mirror 32 at a front surface turning mirror 52 and extends parallel to the axis 30 to a location from which the scene is viewed by the sight user. The front surface mirror 52 is positioned at an angle to receive the light reflected from the mirror 36, and reflect the light along the optical axis 40.

Continuing along the axis 40 is a field lens 54 which collimates the light to an erector lens assembly 56 which is shown as a series of individual lens elements for illustrative purposes. Any combination of optical elements which invert the image may be used. Following the erector lens assembly 56 is a beamsplitter/combiner 58 which may be any of several known types, including a beamsplitter cube, pellicle, or plate beamsplitter.

The beamsplitter/combiner 58 extends parallel to the mirror 46 and below the focusing lens 48. The combining surface of the beamsplitter/combiner 58 is positioned to form an angle of, for instance, 45° with the second optical axis 40. In that way, the light path leaving the focusing lens 48 is turned through an angle of, for instance, 90° at the combining surface of the beamsplitter/combiner 58 to form an image at a plane of a reticle 60 along the optical axis 40. Thus the optical axis 40 at the location of the beamsplitter/combiner 58 is the axis along which both the image from the day viewing system and the image from the night viewing system pass along the same path to the viewer.

An eyepiece lens assembly 62, is positioned adjacent the reticle 60 on the axis 40. The eyepiece assembly 62 is represented by two biconvex lenses for illustration purposes but may include any combination of lenses. The reticle 60 may also be positioned between mirror 52 and erector lens 56 along axis 40.

FIG. 3 is a schematic diagram of a modified version of the sight of FIGS. 1 and 2. A sight 70 is substantially the same as the sight 10 of FIG. 2. Like reference numbers in FIGS. 2 and 3 depict like parts.

One major difference is the inclusion of a short range objective lens assembly 72 in place of the long range objective lens assembly 12. The short range objective lens assembly 82 includes one or more optical elements to collect and focus available light from the viewed scene along the optical axis 30.

The sight is shown surrounded by a housing 74. The housing for the sight of FIG. 2 is the same as the housing 74 with the exception of that portion surrounding the objective lens assembly 12.

The housing 74 has an attachment area 76 for joining the objective lens assembly 72 to the main body of the sight.

A focusing ring 80 and an eyeguard 82 are included on the housing in the area of the eyepiece 62. Areas 84 indicate points of interface with means for mounting the sight to a rifle or other weapon. Any suitable mounting means may be employed, such as a Nato "Stanag" mount, or other well known mount for securing the sight in place.

The operation of the single channel sight of FIGS. 1-3 will now be described. Illumination from a day or night scene is collected and inverted by the objective lens assemblies 12, 72. The light travels along optical axis 30 to the beamsplitter/dichroic mirror 32. The wavelengths of light in the near-infrared spectrum (i.e. 600-900 μm) visible to the image intensifier tube 38, are passed through the beamsplitter 32 and imaged onto a photocathode 44 of the tube 38.

The re-inverted intensified image leaving the tube 38 is collimated by the relay lens system 42. The intensified image is reflected, for example, 90° toward the optical axis 40 by the front surface turning mirror 46. From the mirror 46 the intensified image passes through lens 48 which focuses it onto the reticle 60, through the beamsplitter/combiner 58. The beamsplitter/combiner reflects a portion of the input light and transmits a portion, with some residual absorption or scattering. Thus it reflects a portion of the input light through an angle of, for instance, 90° to pass along the optical axis 40 to the reticle 60.

The wavelengths of incoming light in the visible spectrum, i.e. <700 nanometers, are reflected from the mirror 32 at some angle, for instance, 45° downwardly to the front surface mirror 52. The visible spectrum light is again reflected from the mirror 52 to pass through the erector lens assembly 56, where the image is re-inverted, to the beamsplitter/combiner 58. The beamsplitter 58 passes the light onto the plane of the reticle 60. An optional laser protection filter 64 is provided on the forward surface of the beamsplitter/combiner 58.

The mirrors 46 and 52 are parallel to each other to permit the images from the day and night channels to coincide. Therefore, the angle of the adjustable mirrors with respect to its respective optical axis is stated to be 45° for illustration purposes only.

The coincident images of both the reticle and the day or night images are passed to the eyepiece 62 where they are magnified for viewing by the user. The focusing ring 80 moves the eyepiece 62 toward and away from the user's eye to allow for differences in user vision. The eyeguard 82 is made of a resilient material which protects the user's eye from weapon recoil.

FIGS. 4-6 illustrate a second embodiment of the invention which includes a dual channel day/night weapon sight. This embodiment utilizes separate objective lens assemblies for day and night operations. As with the embodiment of FIGS. 1-3, the night and day viewing systems as shown extend parallel to each other with the night viewing system located above the day system when the sight is in an upright position. This position may be reversed such that the day viewing system is located above the night viewing system.

Reference will now be made to FIG. 4. One channel 90 of a sight 88 is used for day operation and one channel 92 is used for night operation. Parallel optical axes of the two channels are indicated by broken lines 94, 96. The first optical axis 94 extends through the day channel 90, and the second optical axis 96 extends through the night channel 92 to the user of the sight.

An objective lens assembly 98 forms the forward end of the day channel 90. The assembly 98 contains one or more optical elements. Extending rearwardly from the objective lens assembly 98 along the optical axis 94 is an erector lens assembly 100 and an optical beamsplitter/combiner 102. The beamsplitter/combiner may be any one of several well known types. The beamsplitter/combiner 102 is positioned with its combining surface at an angle of, for instance, 45° to the optical axis 94. The beamsplitter/combiner 102 is provided on its forward surface with an optional laser protection filter 122. To the rear of the beamsplitter/combiner 102 is a reticle 104 and an eyepiece lens assembly 106.

The night channel 96 has a separate objective lens assembly 108. The assembly 108 is located above the assembly 98. The forward end of the objective lens assemblies may be positioned so as to be coextensive with each other. The assembly 108 consists of one or more optical elements which direct the image to a night viewing system 110. The night viewing system 110 includes an image intensifier tube 112 followed by a collimator lens assembly 114, a focusing lens 116 and a front surface turning mirror 118. The image intensifier tube is preferably a Generation III (Gen III) image intensifier device which employs a gallium-arsenide photocathode with a non-inverting output. Such tubes are well known in the art and are commercially available from ITT Electro-Optical Products Division, Roanoke, VA. Other types of image intensifier types may be used. The collimator lens assembly 114 is shown with a plurality of biconvex and biconcave lenses although any alternative collimating lens arrangement would be acceptable.

The front surface turning mirror 118 is located above the optical beamsplitter/combiner 102 and is positioned with its forward surface forming a given angle (illustrated as being a 45° angle) with the axis 96. Positioned between the mirror 118 and the optical beamsplitter/combiner 102 is a focusing lens 120. The rearwardly directed surface of the optical beamsplitter/combiner 102 is positioned such that the light path leaving the mirror 118 is turned through an angle of, for instance, 45° to join the optical axis 94 and enter the reticle 104.

A two-axis adjustment means 124 is joined to the turning mirror 118.

FIG. 5 depicts a modified version of the dual channel telescopic sight of the invention. A sight 126 is substantially the same as the sight 88 of FIG. 4. Like reference numbers in FIGS. 4 and 5 depict like parts.

In this version, the objective lens assembly for the day channel has been replaced with a prism 128 which may be an Abbe' type A or other well known prism. In order to further reduce the overall size of the sight, the prism 128 is positioned inwardly of the objective lens assembly 108.

The 126 sight has a day channel 130 and a night channel 132 Optical axes 134 and 136 for the day and night channels, respectively, are shown in broken lines.

The sights shown in FIGS. 4 and 5 operate similarly to the sights of FIGS. 1-3 except for the manner in which light enters the day channel. In FIGS. 4 and 5 the visual spectrum wavelength light enters the sight directly from the scene being viewed. In FIG. 4 this channel begins with an objective lens assembly 98, and in FIG. 5 the channel begins with a prism 128. The prism 128 inverts and reverts the incoming image and retains the generally collimated nature of the light being received rather than employing an objective and subsequent collimator. The erector lens assembly 100 reinverts the image. Although the prism 128 is depicted as a single prism, it may also be a combination of prisms which invert and then revert the image. Examples of single prisms which are suitable for use in the sight are the Abbé prism (Type A) and the Porro prism.

Because the day light enters through a separate channel, the forward mirrors, such as 32, 52, shown in FIGS. 2 and 3 are not needed.

Reference will now be made to FIG. 6 which is a modified schematic version of the dual channel day/night telescopic sight. This modification includes a projected aiming reticle and a direct view capability for the day channel. The sight is useful for unity magnification as described herein although the sight may be easily modified by known means to provide magnification greater than one.

The sight 140 has a night channel 142 and a day channel 144. Optical axes 146, 148, for the night and day channels, respectively, are shown in broken lines.

An objective lens assembly 150 is situated at the forward end of the night channel 142, followed by an image intensifier tube 152 and collimator lens assembly 154 as previously described with reference to FIGS. 2 and 4. A focusing lens 156 and a partial reflector 158 are positioned after the collimator lens 154 on the optical axis 146. The reflector 158 is designed to transmit light in the red wavelength range and reflect light in the green phosphor spectrum, which is the output of the image intensifier tube. Such reflectors are well known. The reflector 158 has its forwardly directed surface at an angle, for instance, of 45° to the axis 146.

The day channel includes an optical beamsplitter/combiner 160 which is situated below the reflector 158. The forward surface of the optical beamsplitter/combiner 160 is provided with a laser protection filter 162, which is optional. Positioned between the reflector 158 and the beamsplitter/combiner 160 is a focusing lens 164.

An aiming point or reticle 166 is positioned above the collimator lens assembly 154. To the rear of the aiming point is a reticle collimator lens 168 and a front surface mirror 170. The mirror 170 is positioned above the partial reflector 158. A focusing lens 164 is positioned between the mirror 170 and reflector 158.

The operation of the sight of FIG. 6 will now be described. During night operation, the image from a distant scene is received by the objective lens assembly 150 and is focused onto the image intensifier tube 152. The intensified image exiting the tube 152, is collimated by the collimator lens assembly 154 and is directed through the focusing lens 156 to the partial reflector 158. Here the intensified image is reflected into the optical beamsplitter/combiner 160 where it is reflected through an angle of, for instance, 90° to the axis 148 and to a user's eye. The aiming point or reticle 166 is a light emitting diode (LED), or LED illuminated pattern which has its output directed to the reticle collimator lens 168. The lens 168 collimates the LED output toward the mirror 170 which is positioned so that the LED output is turned 90° to the partial reflector 158. The LED output is passed through the reflector 158 and enters the beamsplitter/combiner 160 where it is reflected 90° to the user's eye.

The optical path taken by the LED output once it passes through the reflector 158 is the same as that of the intensified image after being reflected by reflector 158. Thus, the user views the intensified night scene overlaid by the aiming point. The aiming point may be a color which will contrast with the shade of the intensified night image. For example, a red aiming point may be used against the green shade of the intensified image. There is a means (not shown) for adjustment of the protected reticle image such that the aim point can be boresighted with a weapon.

During day operation, the image from a distant scene is viewed directly by the user through the beamsplitter/combiner 160. The protection filter 162 provides protection against light such as laser light, which may be injurious to the viewer.

The aiming point for day operation functions in the same way as for night operation. However, the intensity of the aiming point may be adjusted so that the projected aiming point can be viewed against the higher brightness of the daytime scene.

All of the sights of FIGS. 1 through 6 are battery operated. They all have illuminated aiming points or reticle patterns and use an image intensifier tube for night viewing. A battery compartment may be located on one side of the sight, as shown in FIG. 1, or may be located in any other convenient area. Suitable leads extend from the batteries to the image intensifier tube and aiming point or reticle.

All adjustable angles are stated to be 45° for illustration purposes only. The angle required is any angle which will ensure that opposite optical paths and optical axes are parallel to each other.

Although the sights have been described as having the night channel situated above the day channel, it is possible to reverse the channels and still achieve the same results. Moreover, the channels may be placed in a side-by-side relationship.

The sights range in weight from approximately 2 to 4 pounds and in length from approximately 10 to 14 inches.

The sights may be mounted to various types of weapons using commercially available adapter brackets. The sights shown in FIGS. 1-5 use a reticle pattern which is edge illuminated. When the reticle illumination is OFF, the reticle appears dark, as in traditional rifle scopes. When the reticle illumination is ON, the reticle appears as either white, red or some alternative color, depending on the spectral characteristics of the illuminator.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A telescopic sight for day and night operations comprising:
   a first optical assembly for directing an incoming image in the near-infrared spectrum for night operation of the sight along a first optical path;
   a second optical assembly for directing an incoming image in the visible spectrum for day operation of the sight along a second optical path, wherein said second optical assembly includes a prism for inverting and reverting the incoming image on the second optical path;
   an image intensifier assembly located in the first optical path for night viewing of the image, said assembly having an input surface positioned adjacent said first optical assembly and an opposed output surface;
   optical means for day viewing of the image located in the second optical path which is parallel to the first optical path, said optical means having an entrance surface and an exit surface; p1 an ocular lens assembly located on the second optical path for transmitting light received at an input surface thereof from said image intensifier assembly and from said optical means along a common path to a viewer; and
   transmitting means located in a third optical path for transmitting the light from a location on the first optical path which is adjacent the output surface of said image intensifier assembly to a location on the second optical path which is adjacent the exit surface of said optical means, wherein said transmitting means includes a beamsplitter/combiner positioned in the second optical axis and having a front surface adjacent said exit surface of said optical means and a combining surface, said combining surface being positioned at a predetermined angle with respect to the second optical path for receiving the light transmitted from the output surface of said image intensifier assembly and the light transmitted from said exit surface of said optical means and directing the light along the second optical path to said ocular lens assembly.

2. The telescopic sight of claim 1 wherein said transmitting means includes
   a first mirror located in the first optical path and positioned at a predetermined angle thereto, said first mirror receiving the light from said output surface of said image intensifier assembly and reflecting the light in a direction toward the second optical path.

3. The telescopic sight of claim 1 wherein said image intensifier assembly includes an image intensifier device and a relay lens assembly, said relay lens assembly being positioned between said image intensifier device and said transmitting means.

4. The telescopic sight of claim 1 wherein said optical means includes an erector lens assembly.

5. The telescopic sight of claim 1 further comprising a reticle located on the second optical path between said beamsplitter and said ocular lens assembly.

6. The telescopic sight of claim 1 further comprising a housing surrounding the telescopic sight.

7. The telescopic sight of claim 2 further comprising a filter for protecting the viewer against laser radiation positioned on said front surface of said beamsplitter/combiner.

8. A telescopic sight for day and night operations comprising:
   an objective lens assembly for collecting light from a scene in the near-infrared spectrum and directing the light along a first optical path;
   an image intensifier assembly for night operations of the sight located adjacent said objective lens assembly in the first optical path for multiplying the light directed from said objective lens assembly and providing a light-intensified output image for night operation of the sight;
   an optical assembly for collecting light from a scene in the visible spectrum and directing the light along a second optical path for day operation of the sight, wherein the second optical path is arranged substantially parallel to the first optical path, and wherein said optical assembly includes a prism for inverting and reverting the incoming image on the second optical path;
   optical means for transmitting the light received from said image intensifier assembly for night operation and the light received from said light receiving assembly for day operation of the sight along a common optical path to a viewer; and
   said optical means including means located adjacent said image intensifier assembly for transmitting the intensified image therefrom to said optical means, wherein said optical means includes a beamsplitter/combiner having a combining surface for transmitting the light received on one of said first and second optical path and for reflecting the light received on the other of said first and second optical paths through a predetermined angle to said common optical path.

9. The telescopic sight of claim 8 wherein said transmitting means includes a partial reflector.

10. The telescopic sight of claim 8 further comprising an aiming point assembly positioned adjacent said optical means in a plane parallel to said first optical path.

11. The telescopic sight of claim 10 wherein said aiming point assembly includes either one of a light emitting diode or an illuminated pattern, a collimating lens positioned adjacent said light emitting diode for collimating the energy emitted by said light emitting diode and a mirror positioned adjacent said collimating lens for reflecting the collimated energy to said partial reflector.

* * * * *